__United States Patent Office__

3,728,217
Patented Apr. 17, 1973

3,728,217
BUMPY TORUS PLASMA CONFINEMENT DEVICE
Raphael A. Dandl, Oak Ridge, Tenn., assignor to the United States of America as represented by the United States Atomic Energy Commission
Filed June 5, 1972, Ser. No. 259,984
Int. Cl. G21b 1/00
U.S. Cl. 176—3                          10 Claims

ABSTRACT OF THE DISCLOSURE

A toroidal thermonuclear plasma containment device is provided in which full toroidal plasma confinement is made possible by joining a set of individual segments containing steady-state, high-$\beta$, hot electron plasmas, sustained and heated by microwave power, to stabilize a less energetic toroidally confined plasma component. Each segment comprises a high-$\beta$ relativistic electron plasma ring that is formed between two canted mirror coils with resonant and upper off-resonant microwave heating when the two mirror coils are pivoted about parallel axes (normal to the mirror axis) by equal but opposite angles to produce the nonaxisymmetric plasma ring. Thus, a bumpy torus is provided which is made magnetohydrodynamically stable by maintaining in each bump of the torus, and outside the toroidal plasma, a high pressure, relativistic electron plasma ring which is itself stabilized by cold plasma line tying.

BACKGROUND OF THE INVENTION

This invention was made in the course of, or under, a contract with the U.S. Atomic Energy Commission.

For many years toroidal magnetic traps have been attractive from a fusion reactor standpoint because classical confinement in closed traps would permit an advantageous scaling of plasma loss rates with size, a scaling which is not possible in open-ended traps. The fact that single particles are not confined in simple toroidal fields has given rise to several distinct classes of closed traps: Those using external winding to generate the necessary rotational transform, as in Stellarators; those using internal conductors for this purpose, such as Levitrons; those using induced plasma currents, as in Tokamak; and those using a periodic spatial modulation of the magnetic field, the so-called bumpy torus. The first three types of field configurations have been studied theoretically and experimentally in sufficient depth to reveal serious problems which must be overcome before they could provide adequate confinement for a fusion power source. By contrast, the bumpy torus has received very limited attention because of anticipated magnetohydrodynamic (MHD) instability.

Over the last few years experiments have been performed in various magnetic field configurations of a device that is now U.S. Pat. No. 3,230,418, issued Jan. 18, 1966. Of interest is a particular high-beta (plasma pressure/magnetic pressure) hot-electron plasma that is formed in such a device. The plasma is a stable, steady-state, relativistic electron plasma that is of annular shape, is symmetrical about the midplane, and is confined to a region near the center of the device. The ringlike plasma is formed between symmetrical mirrors having a 2:1 magnetic ratio. Hydrogen gas at about $10^{-5}$ torr is broken down using simultaneous resonant and off-resonant microwave heating. The magnetic field is adjusted so that microwave resonance occurs near the cavity throats. The cold electrons are resonantly and nonresonantly heated to form the hot-electron mirror-confined plasma. Plasmas have been formed in such a prior device with kt. (electron temperature) about 1 mev., $n$ (density) about $10^{12}$ cm.$^{-3}$, and stored energies as high as 360 joules.

The amount of cold plasma required in the above device for particle equilibrium exceeds by two orders of magnitude that required for stabilizing the radial edge of the high-beta shell. When enough cold background gas to provide this line typing is used, and when enough attention is paid to the heating geometry, then stable heating can be achieved which results in the gradual formation of the stable, steady-state plasma. The ions that are created by the ionization of the background gas are much too cool for mirror confinement. They drift out of the magnetic trap through the mirrors, resulting in a short average particle lifetime. Because of these disadvantages of the above prior device, there exists a need for a device wherein the particle balance could be improved. The present invention was conceived to meet this need in a manner to be described hereinbelow.

SUMMARY OF THE INVENTION

It is the object of the present invention to provide a modified toroidal thermonuclear plasma containment device wherein full stable toroidal plasma confinement is made possible.

The above object has been accomplished in the present invention by joining a set of individual segments to form a torus, each segment containing a steady-state, high-beta, hot electron plasma ring, sustained and heated by microwave power, to stabilize a less energetic toroidally confined plasma component. Each segment of the torus comprises a high-beta, relativistic electron plasma ring that is formed and maintained between two mirror coils with resonant and upper off-resonant microwave heating when the two mirror coils are pivoted about parallel axes (normal to the mirror axis) by equal but opposite angles to produce the nonaxisymmetric plasma annulus or ring. The electron plasma ring in each segment (or bump) of the torus is stabilized by cold plasma line tying, and these stable electron plasma rings, outside the toroidal plasma, insures the magnetohydrodynamical stability of the bumpy torus.

DESCRIPTION OF THE PREFERRED EMBODIMENT

Figure 1:
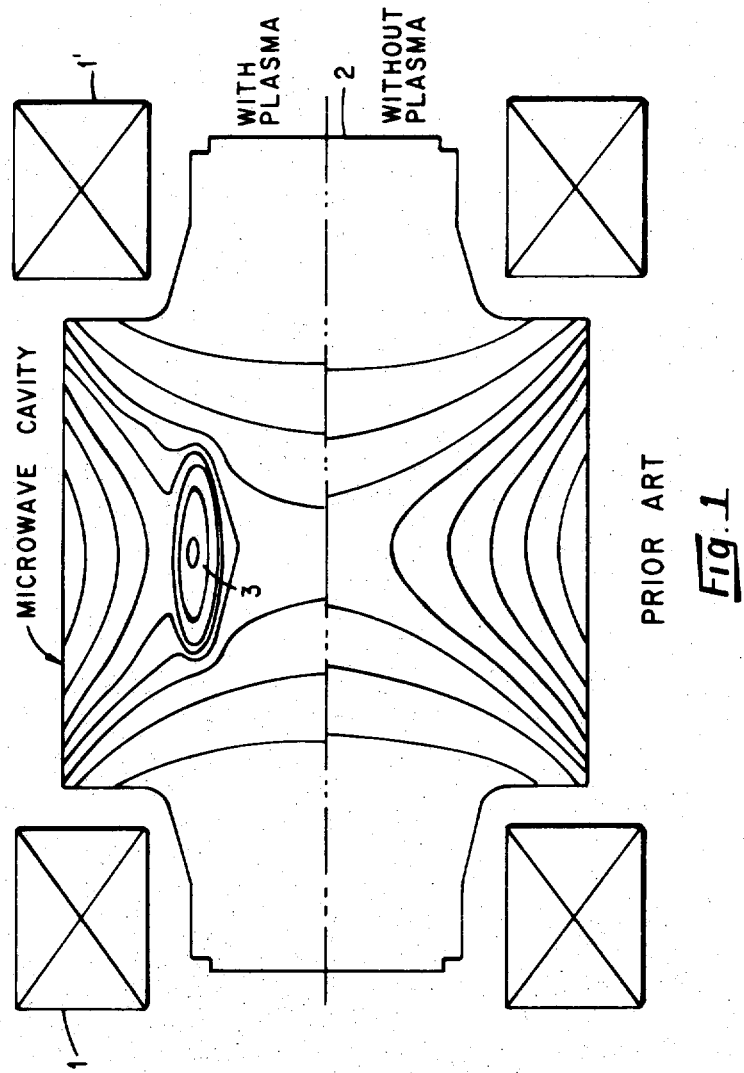
FIG. 1 is a schematic illustration of the magnetic field lines in a prior art mirror device with and without a plasma present.

FIG. 1 illustrates the magnetic field lines of constant surfaces (Mod B) in the above-mentioned prior art device (ELMO) as described in U.S. Pat. No. 3,230,418, with and without a plasma present. The magnetic coils 1 and 1', together with a second set of mirror coils, not shown, produce the field lines shown in the figure within a microwave resonant cavity 2. It can be seen that when a plasma is present the magnetic field Mod B contours close to form an annular ringlike region 3 symmetrical about the midplane axis of the device, and it is within this region 3 that an annular shaped plasma is confined. The plasma is a stable, steady-state, relativistic electron plasma. Some of the operational details of this prior art device have been described hereinabove, and the rest in the abovementioned patent.

Figure 2:
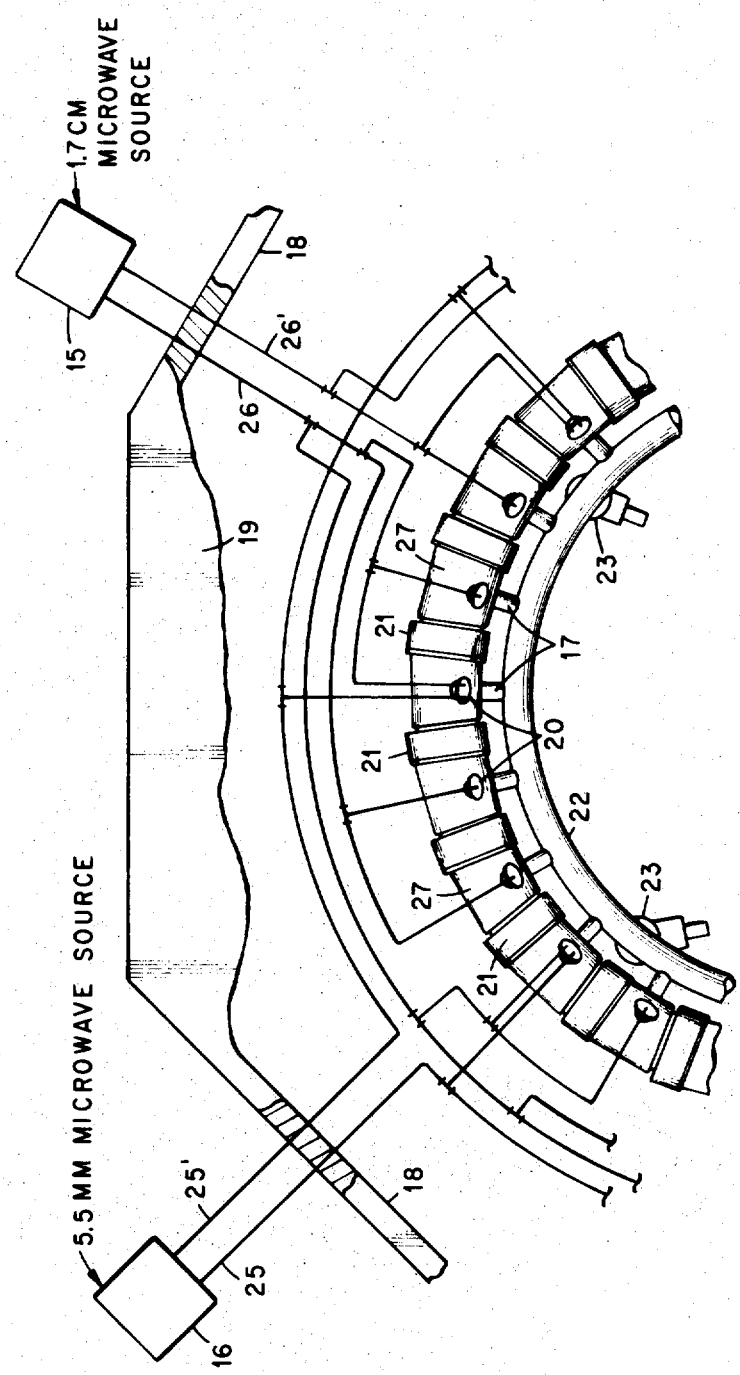
FIG. 2 is a schematic illustration of a portion of the toroidal thermonuclear plasma containment device of the present invention.

The basic plasma forming patented device has been utilized in the toroidal thermonuclear plasma containment device of the present invention as illustrated in FIG. 2 of the drawings. As can be seen in FIG. 2, a plurality of magnetic mirror coil 21 are arranged symmetrically in a toroidal configuration with a joining section 27 between each pair of coils 21 to complete the torus. Only a portion of the torus is shown in FIG. 2 and it should be noted that in the complete torus there are 24 mirror coils 21 with the joining sections 27 therebetween to form the closed torus.

It can be seen from FIG. 2 that the mirror coils 21 are canted at a given angle such that they are further apart at the outside edge of the torus than they are at the inside edge, and in this respect are positionally different from the coil arrangement of the prior art device of FIG. 1. In order to determine whether a ring plasma still exists and retains its highly desirable nature (high-$\beta$) as the mirror field is made nonaxisymmetric as in one section of a torus, a small mirror machine was constructed having mirror coils which could be canted. Such an experimental device has been described in the Oak Ridge National Laboratory Thermonuclear Division Annual Progress Report, ORNL–4688, issued August 1971, pp. 70–72. In such a device, two mirror coils are pivoted about parallel axes (normal to the machine axis) by equal but opposite angles to produce a canted mirror. The maximum angle between the coils was about 22.5°. The nominal mirror ratio of about 2:1 was not significantly changed by this canting operation.

As in the prior patented device, the canted mirror device was fed with both resonant and off-resonant power. A 10.6-gHz. power source with nominal rating of 3 kw. cw. was used for the resonant heating and a nominal 800 w. cw. of 35.7-gHz. power source was used for the off-resonant heating. With a cant angle of about 15°, a $\beta$ of 75% was obtained. With a full cant angle of 22.5°, the $\beta$ was somewhat less than 50%. Other results using skimmer probes mounted on diametrically opposite parts on the midplane indicate that the stored energy decreases in the same manner as in the prior device, indicating that the annular plasma remains in the canted mirror device. Also, skimmer probe profiles of the canted mirror plasma during high-$\beta$ operation show the drift surfaces to be moved towards the toroidal axis by the $\beta$ effect. This movement of the mirror drift surface is in the right direction to somewhat compensate for toroidal curvature. The electron temperature in the canted mirror device measured from the free-free bremsstrahlung appeared to be about the same as in the prior patented device under similar conditions, that is, 700 to 800 kev. Thus, it can be seen that the experimental canted mirror device can be operated to produce a stable high-beta annular plasma therein.

Figure 3:
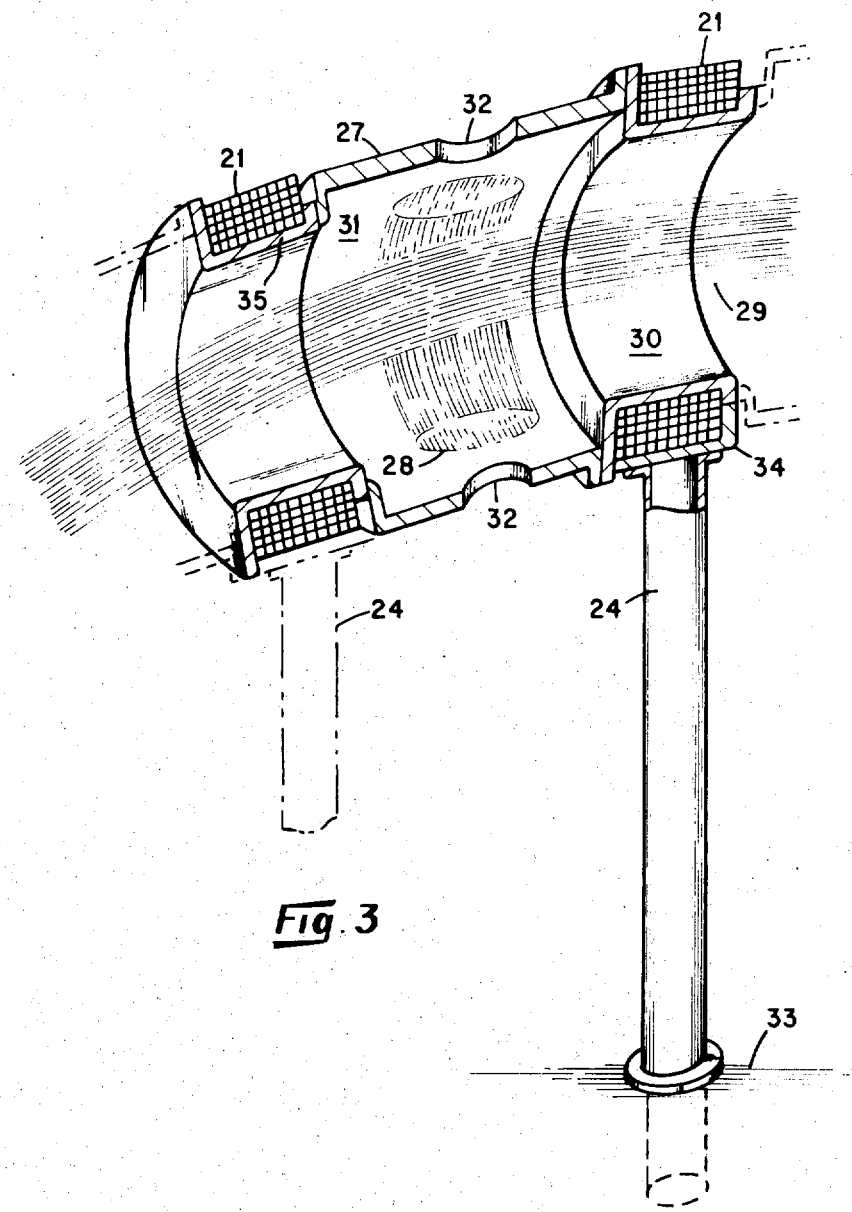
FIG. 3 is a schematic isometric sectional view of two of the mirror coils and a connecting section therebetween of the torus of FIG. 2.

Referring again to FIG. 2, the mirror coils 21 are canted at an angle of 15° when compared with the device of FIG. 1. Each mirror coil 21 is wound on a cylindrical nonmagnetic bobbin 35, as shown in FIG. 3, which will also function as a segment of the composite cavity and vacuum vessel. The vacuum tank will be completed by bolting flanged cylindrical segments 27 to the adjacent coil bobbins. Each tank segment 27 will be water-cooled by means, not shown, and will incorporate flanged radial ports 32 (only two being shown in FIG. 3) located about the circumference for vacuum pumping, gas feed, skimmer probe liiting, and diagnostic access. All flanged joints and openings will be designed with close-fitting metallic contact and applicable screening to provide complete microwave as well as vacuum integrite for the main vacuum tank.

All tank sections of the device of FIG. 2 are connected to a master 10-inch-diameter vacuum manifold 22 through tubular members 17 and metallic screened respective ports 32 in the respective segments 27. A plurality of heavily baffled 10-inch oil diffusion pumps 23 are connected to the manifold 22 and are symmetrically located beneath the manifold 22 around the torus. The system will thus utilize as much symmetry as possible to ensure balanced pumping speed for all mirror sections.

As shown in FIG. 3, the magnet mirror coils 21 are conventional water-cooled copper construction utilizing hollow coper conductor with multiple parallel water paths and the coils are connected in a single series current paht. The 24 mirror coils 21 are connected to the output from four 2.5-mw. DC geerators, not shown, and the coils 21 provide a miximum DC field of 13 kg. with a mirror ratio of about 2:1 with an 18-inch spacing between the coils. Maximum midplane magnetic field is 600 gauss when operated at a current of 7000 amperes at 350 volts from each of the four DC generators. Current density under these conditions is 30,000 amperes/in.$^2$. Maximum cooling water requirements of 1200 gallons per minute will be handled by a demineralized water system, not shown. The output of the four 2.5-mw. DC geerators will be required to energize the complete coil system. Each generator will supply two banks of three adjacent coil groups, each located on opposite sides of the torus. This will aid in establishing and maintaining an inherent balance in the system. Special care will be utilized in winding the coils and routing and placement of interconnecting leads in order to minimize effects of stray circumferential current components upon the toroidal field closure.

The major diameter of the torus will be approximately 10 feet. The mirror coil throat 30 diameter (FIG. 3) will be 10 inches and the cavity 31 outer diameter is 22 inches with each of the cavities 31 containing a ring plasma 28 under operating conditions. The plane of the torus (FIG. 2) will be horizontal and the device will be enclosed by an octagonal lead X-ray shield 18 of 6-inch nominal thickness and 8-foot height above floor level, and be provided with a lead roof 19. The shield 18 is designed to provide an attenuation factor of approximately $10^6$ for the expected X-ray energy distribution at the inside of the wall, and thereby to reduce the anticipated maximum level to 1 mr./hr. or less at the outside of the shield.

Support for the weight of the coil and vacuum tank assembly as well as magnetic force restraint will be provided by a plurality of stainless steel pipe columns 24 located directly underneath the toroidal axis and supported from the flood 33. Each of these columns 24 will be topped with a plate 34 to which a coil bobbin 34 is attached through structural webbing to form a subassembly. The columns 24 will be accurately located and leveled prior to final assembly. Bracing to the floor 33 will be provided to complete the support structure. Thus, there will be a total of 24 support columns 24 for supporting the coil and vacuum tank assembly. The lateral column elasticity will permit shimming the bracing structures prior to anchoring in order to effect precise mechanical assembly. The coluumns 24 will also serve a dual function as conduits for cooling water and electrical supply leads from beneath the floor 33. Each coil will thus be referenced to the floor 33 and constrained by this fastening against a force up to reversal of the magnetic field of ½ of the torus.

In order to provide and sustain the hot electron plasma ring 28 in each of the cavity sections 31 between the respective mirror coils 21 (FIG. 3), a resonant microwave heating source 15 and an upper off-resonant microwave heating source 16 are provided as shown in FIG. 2. The unit 16 is a 18-gHz., 1.7 cm. microwave source, with power levels up to 30 kw. cw. The unit 16 is a 55 gHz., 5.5 mm. microwave source with a maximum output capability of 10 kw. cw. This source 16 may be expanded, if required or desired, to 30 kw. output raising the total power to 60 kw. by incorporating additional 5.5-mm. final amplifier tubes.

The microwave source 15 is connected by suitable waveguides 26 and 26' and associated couplings and auxiliary waveguides to each of the cavities 31 between the respective mirror coils 21 through respective waveguide vacuum windows 20 which are coupled to respective ones of the ports 32 in the respective sections 27 of the torus. The 18-gHz. resonant heating power source 15 consists of two solenoid-focused, five-cavity type Varian Associates 934A klystron amplifiers driven by the output of a single reflex klystron oscillator. Load isolation for the amplifiers will be provided by ferrite circulators. Reflected power sensing in combination with fast crystal switches and power supply crowbars will be used for waveguide arc protection. A complete system of safety interlocks will be incorporated for protection of personnel, tubes, and associated equipment.

The power output of each of the source 15 klystron amplifiers will be divided into 12 equal parts in order to provide separate power feed to each individual mirror region of the torus. Provision of resonant power feed to each mirror region is considered desirable for balanced excitation because of plasma shielding effects. Each klystron will feed alternate mirror regions in order to maintain overall power feed balance. In this manner both klystrons may be operated at their ultimate output capability without necessity for precise output level balancing, although balancing can be readily accomplished if necessary. Sidewall directional couplers and short-slot hybrid junctions will be used to accomplish the necessary power division. Both of these component types are well suited for operation at high cw. power levels. A power transmission of 18 gHz. will be accomplished in standard RG–53/U dominant mode waveguide, and cavity matching will be accomplished with quadrature-type hybrid junctions. Economical flange-mounted mica waveguide vacuum windows will be suitable for vacuum isolation of the individual mirror regions at the power levels involved. The actual power available for each mirror region will be approximately 1.0 kw. when the effects of transmission losses are included.

The microwave power source 16 is connected to every third mirror region by suitable waveguides 25 and 25' and associated couplings and auxiliary waveguides through respective waveguide vacuum windows 20. The 55–gHz. upper off-resonance heating source 16 consists of two Type HAV-3, 5 kw. cs. traveling-wave-tube (TWT) amplifiers which are driven by a single Type HAV-2A TWT amplifier. Drive power for the TAV-2A is in turn derived from a backward wave oscillator. The power outputs of the HAV-3 tubes appear in oversized waveguides and all monitoring, power division, and transmission to each third mirror region will be made in an oversized waveguide in the interest of obtaining reasonable transmission efficiency. The output of each of the HAV-3 tubes will be divided into four equal parts to provide a total of eight 55-gHz. waveguide feeds of approximately 1.0 kw. each to eight mirror regions. These waveguide feeds will be connected to the mirror regions through individual oversized waveguide ceramic vacuum windows, and, as mentioned above, a connection will thus be made to every third mirror region around the major circumference of the torus. In this manner, every region will either have a 55-gHz. power input or be immediately adjacent to a region with such an input. Plasma shielding effects which would prevent propagation of power from one region to another should be minor at the upper off-resonance heating frequency. However, in the unlikely event that every region does require a 55-gHz. input, additional power division can be provided in a manner similar to that used for the 18-gHz. system and an oversized waveguide feed provided for each mirror region.

As mentioned hereinabove, gas is fed into each individual mirror region through respective ports 32 in the respective sections 27 (FIG. 3). This feed gas may be hydrogen, deuterium, or a mixture of deuterium and tritium, for example, and it is supplied from a master supply manifold, not shown, in a conventional manner.

The plurality of vacuum pumps 23 connected to the torus vacuum chamber through the vacuum manifold 22 and connecting pipes 17 are operated to provide a vacuum in the torus vacuum chamber at a value of about $10^{-5}$ torr, for example.

In the device of FIG. 2, the high-beta bumpy torus is thus formed by the closed connection of the set of the annular high-beta, hot-electron mirror plasmas 28 in each of the chambers 31 (FIG. 3) between the respective mirror coils 21. The mirror-confined relativistic electron plasmas 28 would have a shell structure similar to the plasma equilibrium that is provided in the above prior patented device and would be formed in the respective canted mirror regions so that closed magnetic lines tracing the toroidal volume would also trace the high-beta well of the plasmas 28. For a short high-beta annulus the outer surface of the relativistic electron shell, i.e., the part which sees a negative magnetic field gradient, can be line tied by cold plasma for magnetohydrodynamic (MHD) stability and still permit the flux lines from the positive gradient region to be a part of the toroidal confinement geometry. The final equilibrium would be composed of the mirror-confined, line-tied, high-beta electron plasmas 28 of high density and very high temperature, and a toroidally confined, high-density plasma component 29 (FIG. 3).

Four critical regions are provided in this mirror-plasma-augmented toroidal-confinement geometry. The radial extreme of the plasma 28 well is in a region of strong negative field gradient and is made MHD stable by axial cold plasma line tying to conducting walls, which process shorts out instability electric fields. The second critical region is the radial outside of the magnetic well of the plasma 28 which is stable because plasma pressure and magnetic field gradient are in opposite directions. This part of the well would furnish the MHD stabilization of the bumpy torus. The third critical region is the radial inside of the magnetic well of the plasma 28. Here, plasma pressure and magnetic field gradient are in opposite directions, but plasma from this region would be lost into the torus plasma 29 and the center of the torus would be eventually filled with a high-beta plasma and the plasma pressure gradient on axis would tend to be zero. The fourth critical region is axially downstream from and out of the high-beta shell plasma 28. Here, the magnetic field plasma combinations are unstable, but particles on the average see the high-beta well regions more than the fourth region and are thereby stabilized except for a very small class of particles.

Typically the shell plasma 28 would have a temperature of about 1 mev. and a density of $2\times10^{12}$ cm.$^{-3}$, depending upon the choice of heating frequencies provided by the sources 15 and 16 and the magnetic field intensities. The toroidal plasma component 29 would have a temperature of about 1 kev. and a density of $2\times10^{12}$ cm.$^{-3}$. It should be noted that the plasma component 29 will have a higher temperature and larger density when the microwave power levels are increased. The high-beta shell plasma 28 would be neutralized by cold ions formed from the background gas.

Thus, in the operation of the above-described bumpy torus plasma containment device and in the method of forming a stable plasma therein, a plurality of canted magnetic mirror regions, which form a torus vacuum tank, are fed with a selected feed gas, the vacuum tank is evacuated to a selected low pressure, the mirror coils are energized to provide a plurality of magnetic mirror field regions between respective mirror coils around the torus, and microwave resonance heating energy and upper off-resonance microwave heating energy are respectively fed to a plurality of positions around the torus.

The respective microwave heating energies act conjointly to establish and maintain a hot, stable, high-beta, relativistic electron plasma ring within each of the joining sections (bump) between the mirror coils of the torus and also help to sustain a stable toroidally confined, high-density plasma component. The plasma rings act to perturb the vacuum magnetic field so as to provide a stable geometry for the toroidal plasma component, and these plasma rings are line-tied by cold plasma for insuring magnetohydrodynamic stability for the bumpy torus.

The hot electrons of the ring plasmas 28 are losing their energy fast through synchrotron radiation. During the programmed buildup of the fusing toroidal plasma 29, the charged reaction products (alpha particles and tritons) may accumulate where the electron rings were to replace the electrons because of the spatial loss dependencies in a bumpy torus. In such an event, the charged reaction products could be utilized to provide stabilization and ionization of neutral particles, and heating is augmented by microwaves.

Control and matching of the high-beta regions so as to permit formation of a toroidal equilibrium should not be a first-order problem because of the interrelation between the high-beta ring plasmas 28 and the toroidal plasma 29. This interrelation arises by virtue of the coupling between the toroidally circulating particles as a source to the mirror-confined ring plasmas which then determines the confinement boundary. If, however, more detailed control is necessary, the energetic particle flux on radial skimmer probes can be monitored. By using these probes to shape the ring plasmas, the high-beta closure can be effected.

It should be noted that the device of the present invention, as described hereinabove, is not limited to the specific parameters set forth. For example, the number of magnetic mirror coils is not limited to 24, the magnetic field could be made larger taking care to maintain a mirror ratio of about 2:1, and more energietic microwave heating sources could be utilized. The number of mirror coils could be increased to 48 or more to provide a resulting larger torus, for example.

The use of steady-state hot electron ring plasmas in the device of FIG. 2, as described above, will provide MHD stability for the bumpy torus, will enhance the toroidal confinement, will provide collisional heating of ions, and will tend to cancel the toroidal drifts in the nonaxisymmetric mirror fields of this device.

The bumpy torus device of the present invention represents a new approach toward plasma confinement, incorporating the singular advantage of MHD stabilization by high-beta magnetic wells. In addition, there exists some particular advantage for fusion when compared with Tokamaks; for example: the present device is steady state; it is an efficient way to heat ions (through electron impact and electron-cyclotron heating); and fusion power is characteristically higher because of the much higher beta that can be achieved in the present device, as described hereinabove.

This invention has been described by way of illustration rather than limitation and it should be apparent that is equally applicable in fields other than those described.

What is claimed is:

1. A method of establishing a stable, energetic, high-beta plasma within a bumpy torus plasma confinement device, said torus device defining a toroidal vacuum tank made up from a plurality of water-cooled, annular magnetic mirror coils with joining sections therebetween, comprising the steps of evacuating said tank to a selected low pressure, energizing said mirror coils to provide a plurality of magnetic mirror field regions between respective mirror coils around said torus tank, feeding a gas selected from the group consisting of hydrogen, deuterium and tritium to said vacuum tank, feeding microwave resonance heating energy to a plurality of positions around said torus vacuum tank and feeding upper off-resonance microwave heating energy to a plurality of positions around said torus tank, said resonance heating energy and upper off-resonance heating energy establishing and maintaining a hot, stable, high-beta relativistic electron plasma ring within each of said joining sections between said mirror coils and also sustaining a stable toroidally confined, high-density plasma component, said plasma rings perturbing the vacuum magnetic field so as to provide a stable geometry for said toroidal plasma component, said plasma rings being line-tied by cold plasma for insuring magnetohydrodynamic stability for the bumpy torus.

2. A bumpy torus plasma confinement device comprising a plurality of bobbin mounted, water-cooled, annular margnetic mirror coils; a plurality of hollow joining sections positioned between said mirror coils and attached to the bobbins of said coils to form said torus and define a vacuum tank therein; a power supply connected to said mirror coils; means for evacuating said torus vacuum tank to a selected low pressure; means for feeding a gas selected from the group consisting of hydrogen, deuterium, and tritium to said vacuum tank; a first microwave resonance heating source; means for coupling a plurality of outputs from said first heating source to said vacuum tank through respective ones of said joining sections between said mirror coils, a second upper off-resonance microwave heating source; means for coupling a plurality of outputs from said second heating source to said vacuum tank through selected ones of said joining sections, whereby during operation of said device, said first and second heating sources establish and maintain a hot, stable, high-beta relativistic electron plasma ring within each of said joining sections between said mirror coils and also sustain a stable, toroidally confined, high-density plasma component, said plasma rings perturbing the vacuum magnetic field so as to provide a stable geometry for said toroidal plasma component, said plasma rings being line-tied by cold plasma for insuring magnetohydrodynamic stability for said device.

3. The device set forth in claim 2, wherein said mirror coils provide a magnetic field of about 13 kilogauss with a mirror ratio of about 2:1, said coils being energized by a total of about 10 mw. from said power supply, and wherein each of said joining sections is provided with a plurality of radial access ports located about the circumference for vacuum pumping, gas feed, microwave feed, skimmer probe limiting, and diagnostic access, said device further including a plurality of hollow vertical support posts mounted to respective ones of said coil bobbins and to a floor for supporting said torus, said support posts also serving the dual function of conduits for supplying cooling water to said mirror coils and containing electrical supply leads for energizing said mirror coils.

4. The device set forth in claim 3, wherein said means for evacuating said torus vacuum tank includes a vacuum manifold connected to said tank through a respective access port in each of said joining sections, and a plurality of vacuum pumps coupled to said vacuum manifold, said selected vacuum pressure being about $10^{-5}$ torr, and wherein said first microwave resonance heating source is a 18-gHz., 1.7-cm. source, and said second upper off-resonance microwave heating source is a 55-gHz., 5.5-mm. source.

5. The device set forth in claim 4, wherein each of said ring plasmas has a temperature of about 1 MeV and a density of $2 \times 10^{12}$ cm.$^{-3}$, and said toroidal plasma component has a temperature of about 1 kev. and a density of $2 \times 10^{12}$ cm.$^{-3}$.

6. The device set forth in claim 5, wherein the number of said mirror coils in said torus is 24.

7. The device set forth in claim 6, wherein the number of outputs from said second microwave heating source is eight and one each output is connected to every third joining section around said torus.

8. The device set forth in claim 7, wherein the amount of heating power delivered to said vacuum tank through respective joining section access ports from each of said heating sources is about 1 kw. each respective access port.

9. The device set forth in claim 8, wherein said selected feed gas is hydrogen.

10. The device set forth in claim 8, wherein said selected feed gas is a mixture of deuterium and tritium.

References Cited

UNITED STATES PATENTS

| | | | |
|---|---|---|---|
| 3,143,477 | 8/1964 | Dolique | 176—3 |
| 3,160,566 | 12/1964 | Dandl et al. | 313—161 X |

PALMER C. DEMEO, Primary Examiner

U.S. Cl. X.R.

176—5; 313—7, 161, 231; 315—111